(12) United States Patent
Schulte

(10) Patent No.: US 6,568,446 B1
(45) Date of Patent: May 27, 2003

(54) PNEUMATIC BICYCLE TIRE HAVING PROTECTION AGAINST WEAR AND REDUCED ROLLING RESISTANCE

(75) Inventor: Rüdiger Schulte, Winterberg (DE)

(73) Assignee: Continental Aktiengesellschaft (DE)

( * ) Notice: Subject to any disclaimer, the term of this patent is extended or adjusted under 35 U.S.C. 154(b) by 0 days.

(21) Appl. No.: 09/522,780

(22) Filed: Mar. 6, 2000

(30) Foreign Application Priority Data

Mar. 5, 1999 (DE) .......................................... 199 09 648

(51) Int. Cl.$^7$ ................................ B60C 9/11; B60C 9/18
(52) U.S. Cl. ........................ 152/555; 152/451; 152/556; 152/563
(58) Field of Search ................................. 152/196, 197, 152/451, 525, 555, 556, 563, 527

(56) References Cited

U.S. PATENT DOCUMENTS

| | | | | | |
|---|---|---|---|---|---|
| 1,317,701 | A | * | 10/1919 | Gruber | 152/563 |
| 3,982,578 | A | * | 9/1976 | Wild | 152/358 |
| 4,024,901 | A | * | 5/1977 | Poque | 152/354 |
| 4,120,338 | A | * | 10/1978 | Mirtain | 152/354 |
| 4,196,764 | A | * | 4/1980 | Skidmore | 152/527 |
| 4,287,929 | A | * | 9/1981 | Huinink | 152/538 |
| 4,295,511 | A | * | 10/1981 | Mezzanotte | 152/354 |
| 4,744,401 | A | * | 5/1988 | Sowa | 152/559 |
| 5,505,242 | A | * | 4/1996 | Narahara | 152/454 |
| 5,532,312 | A | * | 7/1996 | Gursky | 525/232 |

FOREIGN PATENT DOCUMENTS

JP 61027704 A * 2/1986

OTHER PUBLICATIONS

Derwent Abstract of JP 78023345 B, Mitsuboshi Belting Limited, Jul. 14, 1978.*

* cited by examiner

Primary Examiner—Steven D. Maki
Assistant Examiner—Justin Fischer
(74) Attorney, Agent, or Firm—R W Becker & Associates; R W Becker

(57) ABSTRACT

The present invention relates to a pneumatic tire for a bicycle, especially a mountain bike, the tire having on each respective left and right side a bead each comprising a bead core. A carcass, preferably a diagonal carcass, which has at least one ply of cords, is wound about each bead core. The tire of the present invention also comprises sidewalls extending radially from the axial edges of its tread which each have a textile sheet structure for wear protection on the outer sides of the carcasses.

14 Claims, 1 Drawing Sheet

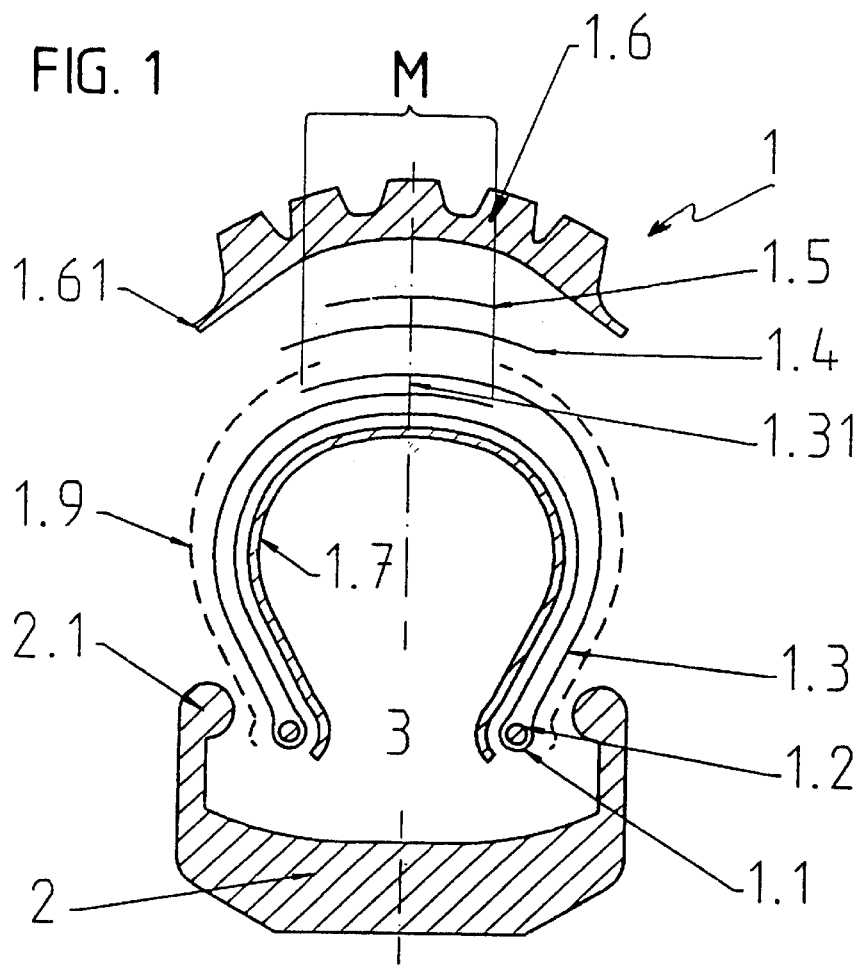
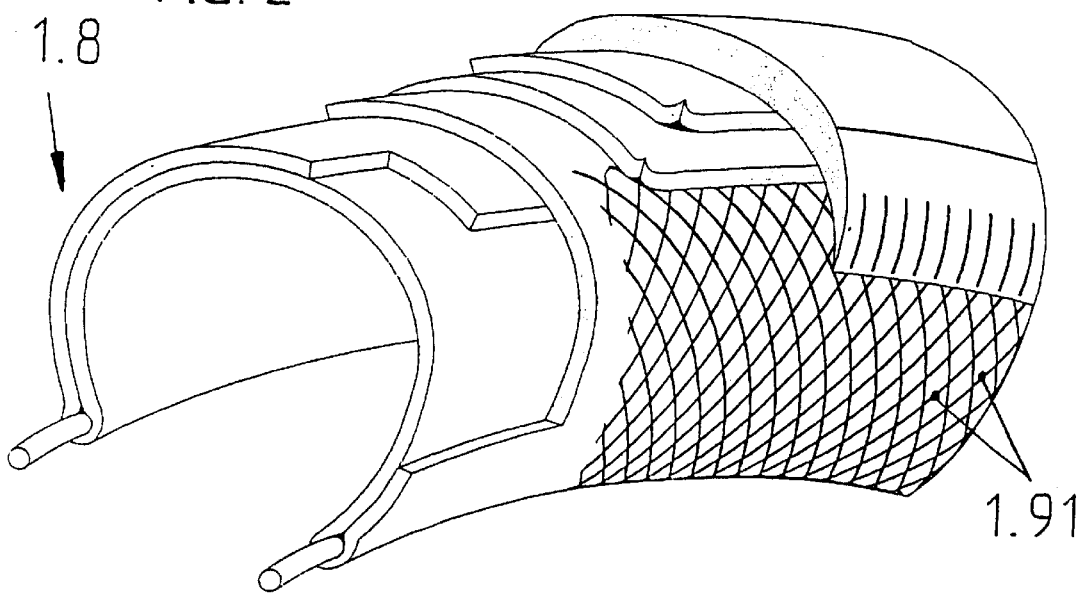

PNEUMATIC BICYCLE TIRE HAVING PROTECTION AGAINST WEAR AND REDUCED ROLLING RESISTANCE

BACKGROUND OF THE INVENTION

The present invention relates to a pneumatic tire for a bicycle. A bicycle pneumatic tire comprises on respective left and right sides thereof a bead, each of which has a bead core. A carcass, preferably, a carcass having diagonally oriented cords, is disposed such that each respective end of the carcass is wound about one of the bead cores. The carcass is comprised of at least one cord ply (which is preferably folded and arranged such that multiple cord layers are produced). A "cord ply" is a rubber layer or sheet reinforced by reinforcements such as cables or cords and these cables or cords are arranged within the cord ply such that substantially all of them in a cord layer extend parallel to one another. The bicycle tire of the present invention comprises, in addition to the afore-described constituent elements, sidewalls which extend along the exterior of the carcass in a wear protecting manner within the axial edges of the tread of the tire.

The bicycle tire of the present invention is particularly adapted for fitment as a bicycle tire for so-called "mountain bikes", otherwise known as off road capable bicycles. With such mountain bicycle tires, in addition to low weight, minimal ground surface pressure, and decreased rolling resistance, a relatively high wear resistance is desirable such that, during cycling through thorny bushes or underbrush or the like, the chances of a tire failure are reduced to the greatest possible extent.

In the historical development of the fabrication of carcasses for pneumatic tires, the deployment of a full weave type of carcass stands as the starting development. Tires of such construction—which engendered relatively low production costs as a result of the reduced number of plies—beneficially revealed, as a function of their own relatively low weight, a more than adequate carcass structure for withstanding the effects of the interior air overpressure. However, the durability of such carcasses was relatively modest.

After several years, tire designers recognized that the intersection locations of a full weave carcass—in other words, the locations where one cord (either a warp or weft cord) overlapped an orthogonally oriented respectively opposite weft or warp cord—led to wear or chafing through of cords. This recognition led to a turning away from full weave carcasses in tire construction and the development of a functional separation: each former full weave carcass construction was replaced with a pair of layers which comprised one respective layer with reinforcements having right side increasing reinforcement strength and the other respective layer with reinforcements having left side increasing reinforcement strength. With regard to the rubber layer or sheet having the therein embedded, parallel extending reinforcements, the term "cord ply" is used while the term "cord" or "tire cord" is used to refer to the yet to be covered in rubber arrangement of the cords.

The above noted approach avoided the creation of cord intersection locations at which reinforcement cords crossed one another without the presence of rubber therebetween. The preferred configuration of diagonal cord carcasses fabricated in this manner should therefore comprise at least two cord layers, whereby, in one of the cord layers, all reinforcement cords increase in one given direction and, in the contiguous cord layer, all reinforcement cords increase in the direction opposite to the one given direction.

As viewed from the perspective of slip movement associated with tire delamination in tractive settings and the hysteresis of the tread material, a portion of the rolling resistance of a tire occurs in its sidewall due to the periodic compression, expansion, and bending of the sidewall rubber during the travel of the tire. The technical development of premium tires thus evolved toward ever decreasing amounts of rubber in the sidewalls and this effect can be particularly noted in the "skinwall" tire models which have come into use in racing activities. In these types of tires, the only rubber to be found in the sidewalls is the rubber added during the calendaring of the cord weave with the rubber mixtures.

The rubber covering of the carcass cords at the sidewall periphery above the thickest location of cords is only a few microns or micrometers thick. As a result of this thinness, the carcass cords are visible through the sidewall, whereby the carcass appears naked or as a "skin".

Such tires permit the achievement of a reduced weight and a relatively low rolling resistance in comparison to "gum-wall" tires in which the carcass in the sidewall region is covered on its respective axial outer side with an additional rubber layer which contains, without fail, carbon black.

Another measure to reduce rolling resistance of tires of the upper quality tire segment includes the use of reinforcements having ever increasing elongation resistance properties, thus permitting the use of thinner reinforcements and, correspondingly, a thinner application of the rubber layer in which these reinforcements are calendared or embedded. A substantial reduction in rolling resistance can be achieved in particular with mountain bike tires subjected as they are to discontinuous travel paths. The customers of such tires are willing to pay for the increased cord density per tire necessitated by the thinning of the cords.

Unfortunately, the problem consequently occurs that the carcass reinforcements are increasingly susceptible to wear in correspondence with their decreasing thickness.

The susceptibility of the cord reinforcements in such tires to wear can, to be sure, be compensated for by the provision of a thick rubber layer (gum-wall) but this tends to defeat the advantages of such tires as the amount of rubber in the sidewall is increased by this compensation approach and, as a result, the rolling resistance is increased.

SUMMARY OF THE INVENTION

One object of the present invention is to fabricate a sidewall configuration for a bicycle tire, in particular, a mountain bicycle tire and, especially, "skinwall" type embodiments of such tires, such that the bicycle tire substantially approaches the reduced weight and minimized rolling resistance of the conventionally known skinwall tire while at the same time substantially approaching the high wear resistance of a rubber walled tire.

In connection with the individually enumerated aspects, the objects of the present invention are accomplished by:

providing a textile sheet structure (1.9), which is especially preferably a ply, as wear protection in the sidewall region on the outside of the carcass, the textile sheet structure having cords (1.91) extending in two cord directions oriented substantially perpendicular to one another, whereby both of the cord directions are diagonal—in other words, at an angle of 30 to 70 degrees with respect to the circumferential direction, and whereby the textile sheet structure is not wound about the bead cores (1.2).

The orientation of the cords diagonally not only saves weight but, additionally, the respective cords in a left hand textile strip for wear protection on the left sidewall and the respective cords in a right hand textile strip for wear protection on the right sidewall which comprise the wear protection textile sheet structures are scarcely extended or elongated by virtue of full inflation of the cured tire.

Preferably, the extension or elongation of the two lamellar textile sheet structures by virtue of the inner tire pressure are substantially completely precluded. This is achievable if the green uncured tire is inflated after the disposition thereon of the two textile sheet structures but before linking or vulcanization (which transform the initially plastic uncured rubber into elastic rubber); this procedure leads to small plastic displacements of the cords of the wear protection textile sheet structures relatively along the thus inflated carcass cords that, on the cured tire, the cords of the wear protection textile sheet structure are only first put in tension upon reaching such inflation pressure as exceeds the pressure imparted during the inflation of the green uncured tire during the procedure just described.

Because the cords of the wear protection textile sheet structure are not at all or, at most, not substantially, loaded by the inner tire pressure, it is particularly recommended that the inflation pressure imparted during the inflation of the green uncured tire is selected to be approximately as high as the working inflation pressure of the cured tire.

The wear protection textile sheet structures of the present invention avoid the necessity of being wound about the bead cores—which would otherwise be called for in view of the further tire building engendered by the addition of the wear protection textile sheet structures—so that no fretting occurs at the cord intersections of the wear protection textile sheet structures during the lifetime of the racing bicycle tire (which was the reason that decades ago full weave webs fell out of usage for tire construction) because the cord intersections of the wear protection textile sheet structures are barely subjected to any pressure or force.

According to a further aspect of the tire of the present invention, an additional increase in the resistance to tear propagation is achievable by integrally interconnecting each cord with the other respective cord at the cord intersections where the cords cross one another (as in a web or full weave) or are wound about one another (as in a loop or hoop web). Such interconnections can be implemented by means of adhesives but are more preferably implemented through melting together of the intersecting cords under pressure.

An integral interconnection of cords at a cord intersection can be advantageously effected, according to a further additional aspect of the tire of the present invention, by.configuration of the wear protection textile sheet structure as a web. This configuration as a web can be achieved by initially disposing two mutually perpendicular cord frameworks, each having internally parallel, preferably monofilament, cords, in superposed relationship on one another. Thereafter, the superposed cord frameworks are pressed together between two heated plates or heated rollers to a combined thickness which approximates the cord thickness, preferably 5 to 10% greater than the cord thickness. The temperature of the press plates or rollers should be just above the melting or softening temperature of a cord. In this manner, a melting together of intersecting cords at cord intersections can be achieved which thereby leads to increased resistance to tear propagation. A construction such as just described will be referred to herein as a "web".

A web appears exactly as a full weave when viewed in top plan view in that each angular image appears as if it is flat. Another example of a web—fabricated to be sure of steel cord, not textile cord—are the steel mats in steel reinforced concrete.

The web of the tire of the present invention can advantageously be configured as a full weave structure. It is necessary with this configuration, as well, that the cords are integrally interconnected with one another at the cord intersections. This can be achieved by disposing the full weave structure so that it is pressed together between two heated plates or heated rollers to a combined thickness which approximates the cord thickness, preferably 5 to 10% greater than the cord thickness. The temperature of the press plates or rollers should be just above the melting or softening temperature of a cord. In this manner, a melting together of intersecting cords at cord intersections can be achieved which thereby leads to increased resistance to tear propagation.

The present invention also contemplates that the textile sheet structure can be configured as a hoop structure, preferably as a hooped knit structure. It is again recommended that the locations at which the cords are in contact with one another—in this instance, the cord intersections—should be integrally interconnected with one another. This can be achieved by disposing the hoop structure so that it is pressed together between two heated plates or heated rollers to a combined thickness which approximates the cord thickness, preferably 5 to 10% greater than the cord thickness. The temperature of the press plates or rollers should be just above the melting or softening temperature of a cord. In this manner, a melting together of intersecting cords at cord intersections can be achieved which thereby leads to increased resistance to tear propagation.

In accordance with more additional aspects of the present invention, the textile sheet structure arranged in the tire sidewall, which is preferably a full weave or a loop structure and optimally a web, offers substantially the same protection from wear as the known gum-walls of tires have offered. The wear resistance of the tire of the present invention is also surprisingly high, to the degree that tensile strain in the cords does not at all occur or, at most, barely occurs; if instead the cords of the textile sheet structure were elongated by the pull exerted thereon by carcass cords and thereafter subjected to the inflation pressure, not only would the durability of the textile sheet structure be reduced, as noted, but also the sought after wear resistance would be reduced.

The textile sheet structure, in contrast to the gum-walls, contributes relatively less to the tire weight and, above all, to the rolling resistance. The present invention thus provides bicycle tires which in terms of weight and rolling resistance are only relatively slightly less performant than skin wall tires and which in their resistance to wear are practically at the level of gum-wall tires. The tires of the present invention are therefore ideal for use as mountain bicycle tires.

The fabrication of tires of the present invention involves configuring a textile sheet strip at a width which approximately corresponds to the curved length of a sidewall cross section. The textile strip section, which is delivered by the textile manufacturer, is cut in cut directions diagonal to a cord direction. The strip from which the webs are cut should be approximately 1.2 meters wide in order to preclude having to dispose piece work elements around the tire circumference.

In the building of the cords into the textile sheet structure by the known method of diagonal construction in which the cord plies are laid up on a smooth surface drum, the beads are set, and the plies are wound therearound, the two diagonal cut full weave strips are deliberately wound a single time around the tire circumference before the setting of the tread strips and—in the event that a belt is also to be set—before the setting of the topmost belt. The ends of the strips can be butt connected to one another without overlapping.

In accordance with yet another aspect of the present invention, the cords of the wear protection textile sheet structures are preferably covered with rubber although only with a substantially sheer thickness. The rubber thickness should, over the extent of a cord, have a value at the most of 90 microns and preferably, a value of between 50 to 60 microns. A very thin rubber coating of this type facilitates the setting of the wear protection textile sheet structure on the carcass onto which it is laid up, leads to a higher delamination resistance of the textile sheet structure with respect to the carcass in the cured tire, and can minimize the ozone and ultraviolet (UV) attacks on the textile sheet structure which arise during tire usage. Moreover, a very thin rubber coating of this type reduces the build up of dirt during submersion of the textile sheet structure.

A very thin rubber coating of the type described can be achieved by coating of the textile sheet structure in a rubber solution before the laying up of the textile sheet structure on the tire build. This rubber solution can be achieved by spraying or immersing or painting. An especially good result with particularly low solution emissions appears to be achievable by means of immersion and thereafter removing excess solution by blade or squeegee. A benzene free ligroine having light petroleum fractions is recommended as a solvent. The application of the very thin rubber coating by calendaring is necessarily not practical.

In the following description of another aspect of the present invention, the term "wide disposition" or "wide application" of the wear protection web is to be understood to mean: the distance from cord intersection to cord intersection (in the case of a web) or, respectively, from cord wrap to cord wrap (in the case of a weave) should be at least 4 times and, preferably, 5 times as great as the thickness of the cord; this is for the reason that the thickness of the cord, subjected to the heat and pressure associated with the creation of the cord intersections, is not constant and is, therefore, stopped at the least thickness between a pair of cord intersections or cord wraps. The absolute distance between a pair of cord intersections or cord wraps should, in dependence upon the cord thickness, be at a value between 0.8 to 3 mm and, in particular, at a value preferably between 1.3 and 1.8 mm.

It is to be understood that relatively thinner cords should be disposed relatively more closely to one another than relatively thicker cords. In this regard, the cord thickness, in dependence upon the magnitude of its loading, should be between 0.2 to 0.7 mm and, in particular, should be preferably 0.4 mm. This preferred cord thickness of 0.4 mm is particularly efficacious in connection with the preferred cord distance of between 1.3 to 1.8 mm.

A particularly favorable relationship between the increasing wear resistance, on the one hand, and the tire weight, the rolling resistance, and cost, on the other hand, is available if the warp and weft cords are formed of nylon 6.6. It appears to be possible to employ monofilament up to a thickness value of 0.4 mm, monofilament having an especially good wear resistance capability in relationship to its weight. The use of polyfilament for relatively thicker cords appears to be necessary in order to preclude the occurrence of a too large stiffness property in the sidewalls.

Many commercially available textile sheet structures exhibit a different strength in one cord direction than in the other cord direction; this is particularly the case with full webs in which the warp is dimensioned stronger than the weft. For this reason, the warp cords may be thicker and/or less tightly twisted and/or at a greater cord density than the weft cords. Analogous configurations are also possible with a weave. It is known that a non-uniformity in the cords in both cord directions contributes to a further increase in the wear resistance of the tire whose slip direction is established such as, for example, through an appropriate sidewall indication.

With regard initially to a free rolling tire, it can be observed that sinking into an aggressive tractive setting at the beginning will effect high wear on the tire sidewalls as compared to climbing out of the aggressive tractive setting at the end thereof. As viewed from the perspective of the bead—which is appropriate for the reason that the local anchoring of the wear protection thereat is stiffer than at the tread surface edge—it can be observed that all cords of the textile sheet structure forming the wear protection are under stress. If a random initial release or tear has occurred somewhere thereon, the tire pressure thereagainst becomes a delamination force.

With regard now to a driven rear axle tire, it can be observed that there is slip against the drive direction. This means that the cords which increase in the direction of rotation—these are the cords which extend in the rotation direction as one follows the cord from radially inside to radially outside the tire—are loaded under greater pressure than the cords in a free rolling tire. Accordingly, the cords which increase in the counter rotational direction are subject to relatively less pressure and delamination force.

For this reason, it is advantageous, with respect to a rear drive tire designed to rotate in a preferred direction, if the stronger and/or more densely arranged cords of the wear protection are the cords which increase in the direction of rotation and the weaker and/or less densely arranged cords of the wear protection are the cords which increase in the counter rotational direction.

With regard now to a braked front tire, it can be observed that a slip occurs in the drive direction. This means that the cords which increase in the counter rotation direction are more strongly subjected to pressure than those of the free rolling tire.

Consequently, the cords which increase in the rotation direction are subjected to relatively less pressure and delamination force. For this reason, it is advantageous for a front tire designed to rotate in a preferred direction, if the stronger and/or more densely arranged cords of the wear protection are the cords which increase in the counter rotation direction and that the weaker and/or less densely arranged cords of the wear protection are the cords which increase in the rotation direction.

The prior discussion is also applicable to the construction of the sidewalls of the tire.

The warp and weft cords of the wear protection web can be fabricated in differing colors to aid in foreclosing mistaken selection of the appropriate wear protection web during tire construction.

The present invention has applicability to tires adapted to enclose tubes as well as tubeless tires; tubeless tires may be preferable due to reduced rolling resistance and less abrupt pressure loss properties.

A tire tube must necessarily be formed of a rubber mixture substantially comprising natural rubber in order to responsibly limit the rate at which a tear will grow in the event of a tire failure. In particular, racing tires—which are subjected to relatively high speeds and corresponding longer braking travel until brought to a stop—must often be constructed with natural rubber in lieu of butyl rubber with the butyl rubber's attendant beneficial thickness property and this leads to the situation wherein the tube walls must be formed of relatively large thickness to compensate for the effect of the relatively thin formation capabilities of the natural rubber for wall thickness. The total weight of the tire is correspondingly increased which leads, in turn, to increased rolling resistance.

In correspondence with the synergistic effect of the high wear resistance of tires constructed in accordance with the present invention and thickness build up which reduces the risk of pinching, the thickness of the halogen butyl impermeable or sealing liner disposed on the tire interior can be beneficially held to a thin dimension—for racing tires, preferably to a value on the order of 0.3 mm; for other tires, to a value on the order of 0.5 mm. The halogen butyl rubber with its known high impermeability capability can thus even be deployed, in spite of its mechanical sensitivity, on mountain bike tires which are subjected to high performance challenges.

According to another advantageous aspect of the present invention, the textile sheet structure which reinforces the sidewall extends into the bead region of the tire and this offers the opportunity to omit the customary bead protecting belt or band which typically provides wear protection with respect to the rim flange on which the bead is mounted. Correspondingly, the tires constructed in accordance with the present invention can be constructed with the most avant garde configurations which are often sought by the sport challenge seeking purchasers of skinwall type tires. A tire constructed in accordance with the present invention characteristically features a carbon black free sidewall rubber (which permits an especially low rolling resistance performance) and a relatively reduced rubber thickness which lends a half transparent appearance to the tire.

BRIEF DESCRIPTION OF THE DRAWINGS

FIG. 1 is a cross sectional view of an embodiment of the bicycle tire of the present invention configured as a mountain bicycle tire; and FIG. 2 is a sectional perspective view of a portion of the bicycle tire shown in FIG. 1.

DETAILED DESCRIPTION OF A PREFERRED EMBODIMENT

FIG. 1 shows an embodiment of the bicycle tire of the present invention. The bicycle tire 1 is mounted on a known rim 2. The rim 2 is thickened in the region of the mid circumferential plane 3 of the bicycle tire 1. The rim 2 includes on respective right and left sides thereof a rim flange or bead seat 2.1 for retaining the beads 1.1 of the bicycle tire 1. A respective bead core 1.2 is comprised in a known manner in each bead 1.1.

A ply 1.3 is wound around each respective bead core 1.2, the ply 1.3 having a cord angle of approximately 45 degrees with respect to the circumferential direction of the bicycle tire. The overlapping of the overlengths 1.31 of this ply 1.3 under the tread surface central region M produces a two layer carcass having diagonally extending cords. Two small aramid cord plies 1.4 and 1.5 having the highest cord angles are disposed radially under the tread strip 1.6 to increase the puncture resistance and reduce the tension between the tire and the road surface which contributes to the decrease in traction and the increase in rolling resistance. The aramid cord plies 1.4 and 1.5 operate similar to a belt in the tire construction.

The interior of the bicycle tire 1 is lined by an impermeable liner 1.7 so that the bicycle tire is operable as a tubeless-type tire. The liner 1.7 is comprised of a conventionally known butyl rubber mixture.

The present invention is related to the configuration of the exterior of the sidewalls 1.8. Extending over the two thin rubber carcass layers 1.3 and 1.31, to protect against wear, is a textile sheet structure 1.9 having a rubber layer of similar thinness. As seen in the drawings, each textile sheet structure 1.9 extends from the underside of the respective bead to under the edges 1.61 of the tread strip 1.6. An especially secure anchoring of the circumferentially extending radially outer edge of each textile sheet structure 1.9 is obtained if this edge is disposed between the aramid cord sheets 1.4 and 1.5. This disposition acts to mitigate the stiffness on the edges of the aramid cord sheets 1.4 and 1.5 and mitigates the correspondingly occurring shear stress concentration thereat.

Because the textile sheet structure 1.9, which has been previously immersed in a rubber solution to receive a thin rubber coating applied thereto, extends at least radially under the bead seat 2.1, the bicycle tire of the present invention is constructed without the bead seat protective band typically found in skinwall tire construction. This thus preferred method of constructing the bicycle tire of the present invention enables the bicycle tire to be fabricated in a manner which is not more expensive than the fabrication process of a conventional skinwall tire. To be sure, the bicycle tire of the present invention engenders somewhat higher material costs.

The afore described textile sheet structure 1.9, in the form of a web, which is hereby designated as the most preferred variant of the bicycle tire of the present invention, includes monofilament cords of nylon 6.6 running in both cord directions. The cord thickness at an intersection of two cords is at a value of 0.35 mm in this variant.

The green rubber solution employed for immersion of the web should preferably comprise a relatively high portion of natural rubber and no carbon black. A light, preferably benzene free, ligroine fraction is expediently applied as the solvent.

FIG. 2 is a perspective view in partial section of the tire 1 shown in FIG. 1. The cords are schematically represented thereon with solid lines for purposes of demonstrating scale although it is to be understood that the cords are coated in the thin rubber coating and would otherwise therefore be designated by broken lines in FIG. 2. The wide disposition of the textile sheet structure 1.9 can be clearly seen in FIG. 2. The spacing or distance from a cord center to an adjacent cord center is 1.7 mm in both cord directions.

The descriptions herein of preferred variations and aspects of the tire of the present invention is not intended to limit the scope of the invention. Instead, it is contemplated that the present invention extends to all variations of a textile sheet structure for providing wear protection in the sidewall of a tire.

The specification incorporates by reference the disclosure of German priority document 199 09 648.1 of Mar. 5, 1999.

The present invention is, of course, in no way restricted to the specific disclosure of the specification and drawings, but also encompasses any modifications within the scope of the appended claims.

What I claim is:

1. A pneumatic bicycle tire comprising:

a pair of beads each having a bead core;

a carcass having at least one ply and extending from one bead core to the other bead core and wound around the pair of bead cores;

a tread strip having axial edges; and a pair of sidewalls, each sidewall extending from a respective axial edge of the tread strip and having a textile sheet structure for wear protection disposed outwardly of the carcass, the textile sheet structure having cords extending in two cord directions oriented substantially perpendicular to one another, both of the cord directions being diagonal with respect to the circumferential direction of the tire at an angle of 30 to 70 degrees thereto, and the textile sheet structure not being wound about the bead cores, wherein the radially outermost edge of the textile sheet structure extends axially under the tread strip, and wherein the textile sheet structure of each respective sidewall is covered with rubber and the rubber covered textile sheet structure forms the axially outermost rubber portion of the respective sidewall.

2. A pneumatic bicycle tire according to claim 1 wherein each cord of the textile sheet structure, at the cord intersections at which it crosses or wraps another cord, is integrally connected with the intersecting cord by a selected one of adhesive and melting.

3. A pneumatic bicycle tire according to claim 1 wherein the cords of the textile sheet structure are covered with rubber whose thickness over the extent of each cord is at most 90 microns or micrometers.

4. A pneumatic bicycle tire according to claim 3 wherein at least the rubber covering of the textile sheet structure is absent of carbon black.

5. A pneumatic bicycle tire according to claim 1 wherein the textile sheet structure is a web.

6. A pneumatic bicycle tire according to claim 1 wherein the textile sheet structure is a full woven fabric.

7. A pneumatic bicycle tire according to claim 1 wherein the textile sheet structure is a hoop woven structure.

8. A pneumatic bicycle tire according to claim 1 wherein the cord arrangement of the textile sheet structure is such that the distance between adjacent pairs of cord intersections is at least four times as great as the thickness of a cord as measured between the adjacent pair of cord intersections.

9. A pneumatic bicycle tire according to claim 1 and further comprising an impermeable liner whereby the tire is a tubeless tire.

10. A pneumatic bicycle tire according to claim 1 wherein the textile sheet structure extends radially to the bead of the tire.

11. A pneumatic tire according to claim 1 wherein the tire is free of a bead seat protection band in its beads.

12. A pneumatic bicycle tire according to claim 1 and further comprising two circumferentially extending belts in the zenith of the tire, wherein the radially outermost edge of the textile sheet structure extends between axial ends of the belts.

13. A pneumatic bicycle tire comprising:

a pair of beads each having a bead core;

a carcass having at least one ply and extending from one bead core to the other bead core and wound around the pair of bead cores;

a tread strip having axial edges; and a pair of sidewalls, each sidewall extending from a respective axial edge of the tread strip and having a textile sheet structure for wear protection disposed outwardly of the carcass, the textile sheet structure having cords extending in two cord directions oriented substantially perpendicular to one another, both of the cord directions being diagonal with respect to the circumferential direction of the tire at an angle of 30 to 70 degrees thereto, and the textile sheet structure not being wound about the bead cores, wherein the radially outermost edge of the textile sheet structure extends axially under the tread strip, and wherein the cords of the textile sheet structure are covered with rubber whose thickness over the extent of each cord is at most 90 microns.

14. A pneumatic bicycle tire comprising:

a pair of beads each having a bead core;

a carcass having at least one ply and extending from one bead core to the other bead core and wound around the pair of bead cores;

a tread strip having axial edges; and a pair of sidewalls, each sidewall extending from a respective axial edge of the tread strip and having a textile sheet structure for wear protection disposed outwardly of the carcass, the textile sheet structure having cords extending in two cord directions oriented substantially perpendicular to one another, both of the cord directions being diagonal with respect to the circumferential direction of the tire at an angle of 30 to 70 degrees thereto, and the textile sheet structure not being wound about the bead cores, wherein the radially outermost edge of the textile sheet structure extends axially under the tread strip, and wherein the textile sheet structure extends radially to the bead of the tire.

* * * * *